(12) United States Patent
Mollmann

(10) Patent No.: US 8,313,279 B2
(45) Date of Patent: Nov. 20, 2012

(54) DUAL ROTOR VIBRATION MONITORING

(75) Inventor: Daniel Edward Mollmann, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1501 days.

(21) Appl. No.: 12/106,491

(22) Filed: Apr. 21, 2008

(65) Prior Publication Data
US 2009/0263247 A1  Oct. 22, 2009

(51) Int. Cl.
*F01D 25/04* (2006.01)
(52) U.S. Cl. ............................ 415/1; 415/119
(58) Field of Classification Search ............ 416/129
See application file for complete search history.

(56) References Cited

U.S. PATENT DOCUMENTS

| | | | |
|---|---|---|---|
| 4,485,678 A * | 12/1984 | Fanuele | 73/660 |
| 4,976,102 A | 12/1990 | Taylor | |
| 5,028,001 A | 7/1991 | Bender et al. | |
| 5,079,916 A | 1/1992 | Johnson | |
| 5,172,325 A | 12/1992 | Heidari | |
| 5,214,585 A | 5/1993 | Ehrich | |
| 5,724,271 A | 3/1998 | Bankert et al. | |
| 6,341,419 B1 | 1/2002 | Forrester et al. | |
| 6,354,780 B1 | 3/2002 | Davis et al. | |
| 6,445,995 B1 | 9/2002 | Mollmann | |
| 6,684,626 B1 | 2/2004 | Orlando et al. | |
| 6,909,948 B2 | 6/2005 | Mollmann et al. | |
| 6,983,199 B2 | 1/2006 | Mollmann et al. | |
| 7,243,023 B2 | 7/2007 | Skilton | |

OTHER PUBLICATIONS

Goodman, T.P., "A Least-Squares Method for Computing Balance Corrections," Journal of Engineering for Industry, Aug. 1964, pp. 273-279.

* cited by examiner

*Primary Examiner* — Richard Edgar
(74) *Attorney, Agent, or Firm* — David J. Clement; Trego, Hines & Ladenheim, PLLC

(57) ABSTRACT

Vibration is monitored in a dual rotor engine. A first total vibration of the engine is measured during operation. Relative phase of the two rotors is then clocked, and a second total vibration of the engine is then measured during operation. First and second total unbalances are then resolved at a common response frequency from the measured total vibrations. First and second rotor unbalances are then resolved for the corresponding rotors from the first and second total unbalances. In a further method, corresponding corrective balance weights may be determined for offsetting the resolved rotor unbalances.

20 Claims, 2 Drawing Sheets

DUAL ROTOR VIBRATION MONITORING

BACKGROUND OF THE INVENTION

The present invention relates generally to gas turbine engines, and, more specifically, to vibration therein.

In a gas turbine engine, air is pressurized in a compressor and mixed with fuel in a combustor for generating hot combustion gases discharged into a high pressure turbine (HPT) that powers the compressor. And, the gases are then discharged through a low pressure turbine (LPT) that typically powers a fan in a turbofan aircraft engine application.

The HPT rotor blades power the corresponding rotor blades of the compressor through one drive shaft, and the LPT rotor blades power the fan blades through another drive shaft. The drive shafts and associated rotor blades are suitably mounted in bearings supported in corresponding frames in the engine.

The HPT and its drive shaft operate at substantially high rotary speed during operation, and the LPT and its drive shaft operate at a relatively low rotary speed for powering the fan blades for maximum propulsion efficiency during aircraft flight.

The turbine engine is axisymmetrical about a longitudinal or axial centerline axis and is subject to small variations in dimensional configurations of its many components. Accordingly, the center of gravity of each rotary stage in the engine may be slightly offset or eccentric from the centerline axis which will then result in corresponding vibratory unbalance of the engine during operation over its operating speeds.

Accordingly, known procedures are used to measure rotor unbalance and then corrective balance weights may be installed in the engine to drive the center of gravity closer to the centerline axis and reduce undesirable levels of unbalance.

Since a gas turbine engine has many stages of rotor blades, engine balancing may be effected at any one or more of the various stages. However, in practice the inherent complexity of the modern gas turbine engine prevents unobstructed access to most of the rotating stages, and balance corrections are typically applied at an accessible stage such as the fan.

Although each rotor stage may contribute to the resulting engine unbalance, single-plane balancing of the entire engine is typically sufficient for reducing engine unbalance to a suitably small level.

In one conventional method of balancing a gas turbine engine, a vibration sensing accelerometer is installed in the engine at any suitable location for detecting vibrations or vibratory response of the engine. Since the rotor unbalance of engine is carried through the bearings which support the drive shafts in corresponding engine frames, the vibration sensor is typically located in one of the bearing planes in the corresponding supporting frame for detecting vibratory response.

The total vibratory response of the engine may therefore be measured in a single sensor which produces a single vibration signal containing the various frequencies of vibration in the engine.

Since the center of gravity unbalance of the rotor repeats once per revolution (1/rev) it provides a fundamental or synchronous vibration component of the total vibration signal, with higher order harmonics thereof. Furthermore, other vibratory response of the many rotating components of the engine are also detected by the sensor at corresponding vibratory frequencies.

Conventional procedures may then be used to filter from the total vibration signal its many constituent parts at corresponding natural frequencies. For example, a Fast Fourier Transform (FFT) is commonly used to transform the time domain of the total vibration signal into the frequency domain having corresponding amplitudes of the resonant responses.

Since the fan and compressor drive shafts operate at different rotary speeds the corresponding synchronous vibrations therefrom will occur at two distinct fundamental frequencies, and therefore provide a direct indication of corresponding vibratory unbalance of their corresponding rotors.

Since the relatively large fan typically introduces a correspondingly large component in engine vibration, the fan itself may be balanced using a corresponding balance weight for reducing the overall engine vibration levels.

The requisite balance correction may be mathematically computed in a conventional process using influence coefficients such as those described by Thomas P. Goodman in his paper in the Journal of Engineering for Industry, August 1964, pp. 273-279, and entitled "A Least-Squares Method for Computing Balance Corrections," incorporated herein by reference.

In this balancing technique, a sample balance weight, or unit correction mass, is installed on a rotor and its affect on rotor vibration is measured. Since the balance weight is located at a specific radius from the centerline axis of the rotor, its affect is measured in mass and radius, and is typically expressed as ounce-inch, or g-cm. The resulting vibration of the rotor as detected by the vibration sensor will have a corresponding amplitude in mils, for example, at a corresponding synchronous frequency.

Accordingly, by knowing the influence coefficients for a particular rotor, then suitable corrective balance weights may be determined for offsetting measured vibratory response attributed to rotor unbalance.

Indeed, a vibratory monitor in the form of a dedicated computer is commonly used in modern turbofan aircraft engines for automatically monitoring in real time the vibratory response of the engine. The measured signal includes total vibration which is resolved in the frequency domain for synchronous vibrations. Since each engine is initially balanced at the factory, monitoring of rotor vibration may be used to detect changes in the engine which increase unbalance over engine life.

Fundamental to this vibration monitoring procedure and resulting balancing is the different rotary speeds of the drive shafts which result in different synchronous vibrations in the measured total vibration signal, which are readily distinguishable.

However, a new type of turbofan engine creates a special problem in vibration monitoring and subsequent balancing. In the unducted fan (UDF) turbofan engine, the LPT has a special configuration including interdigitated rotor blades supported on corresponding LPT rotors and from which corresponding rows of unducted fan blades extend radially outwardly.

The two LPT rotors are designed for counterrotation at equal but opposite rotary speeds and have the particular advantage of high propulsion efficiency for improving specific fuel consumption (SFC).

The engine includes a digital computer controller configured for matching the rotary speeds of the two rotors to reduce or prevent undesirable beating thereof which would introduce undesirable noise into the aircraft cabin.

Since the two rotors have matched operating speed, the measured vibratory responses thereof will occur at the same frequency and it is therefore impossible to distinguish the separate vibratory responses of the two rotors from each other using the conventional frequency analysis procedure described above.

Accordingly, it is desired to provide a new frequency analysis method for monitoring vibration in a dual rotor engine.

BRIEF DESCRIPTION OF THE INVENTION

Vibration is monitored in a dual rotor engine. A first total vibration of the engine is measured during operation. Relative phase of the two rotors is then clocked, and a second total vibration of the engine is then measured during operation. First and second total unbalances are then resolved at a common response frequency from the measured total vibrations. First and second rotor unbalances are then resolved for the corresponding rotors from the first and second total unbalances. Corresponding corrective balance weights may then be determined for offsetting the resolved rotor unbalances in a particular species of the method.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
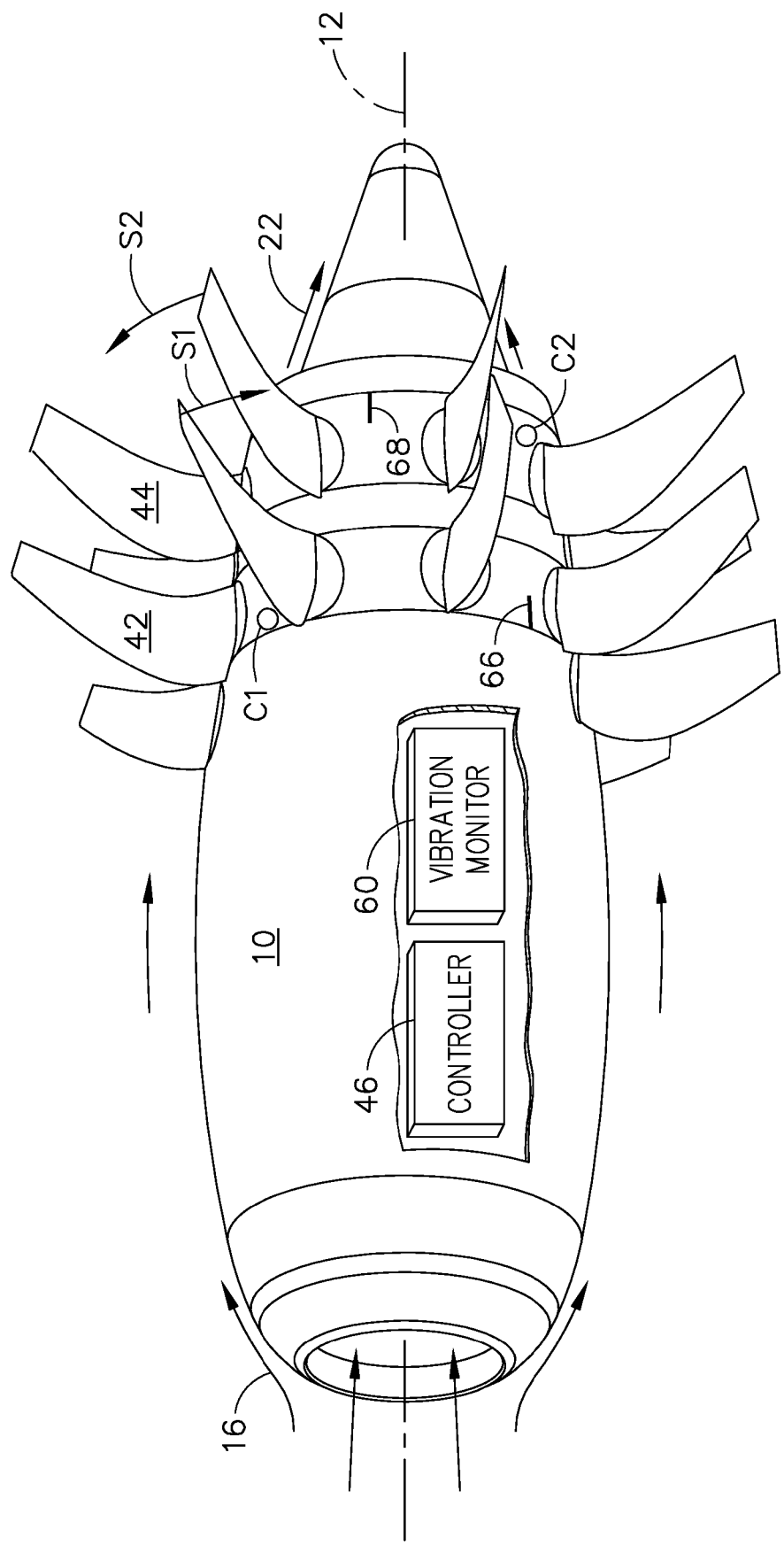
FIG. 1 is an isometric view of an exemplary UDF turbofan gas turbine engine for powering an aircraft in flight.

Illustrated in FIG. 1 is a unducted fan (UDF) turbofan aircraft engine 10 which is axisymmetrical about a longitudinal or axial centerline axis 12. The engine is shown schematically in FIG. 2 and includes a low pressure fan or booster compressor 14 which first receives ambient air 16 for pressurization thereof.

A multistage, high pressure axial compressor 18 follows the fan 14 for further pressurizing the air 16 which is then mixed with fuel inside an annular combustor 20 for generating hot combustion gases 22.

A high pressure turbine (HPT) 24 first receives the hot combustion gases from the combustor and powers the compressor 18 through a first drive shaft 26.

An intermediate pressure turbine (IPT) 28 follows the HPT 24 and drives the fan 14 through a second drive shaft 30 disposed concentrically inside the first drive shaft 26.

A low pressure turbine (LPT) 32 follows the IPT 28 and receives the combustion gases therefrom. The LPT includes a first or outer rotor 34 and a coaxial second or inner rotor 36.

Several stages or rows of first rotor blades 38 extend radially inwardly from the first rotor 34 and are interdigitated with corresponding stages or rows of second rotor blades 40 extending radially outwardly from the second rotor 36.

Unlike a typical LPT including corresponding stator vanes preceding each row of rotor blades, the LPT 32 includes the first rotor blades 38 instead of stator vanes preceding corresponding rows of the second rotor blades 40.

The cooperating stages of first and second rotor blades 38,40 are configured for counterrotation of the supporting first and second rotors 34,36 at equal, but opposite rotary speeds, SI equals minus (−) S2.

Furthermore, a forward row of unducted first fan blades 42 extends radially outwardly from and is supported by the first LPT rotor 34.

Similarly, an aft row of unducted second fan blades 44 extends radially outwardly from and is supported by the second rotor 36.

The forward and aft rows of fan blades 42,44 extend radially outwardly from the engine nacelle and are correspondingly driven by the two LPT rotors 34,36 in counterrotation with equal and opposite rotary speeds S1, S2.

This UDF turbofan engine was first described in U.S. Pat. No. 5,079,916, assigned to the present assignee, and is also the subject of other issued patents in various further configurations thereof.

Fundamental to the UDF turbofan engine is the counterrotation of the two LPT rotors 34,36 at matching rotary speeds.

In particular, the engine includes a digital computer or controller 46 specifically configured for controlling operation of the engine over its operating cycle including startup through takeoff and cruise operation of the engine 10 from minimum to maximum rotary speeds.

The controller precisely controls counterrotation of the two LPT rotors 34, varying pitch of the corresponding fan blades 42,44 for example, to ensure that the rotary speed S2 of the second blades 44 matches the rotary speed SI of the first blades 42 within suitably small tolerances. For example, the rotary speeds of the two rotors 34,36 can be controlled within less than one revolution per minute (RPM).

Since the two rows of unducted fans 42,44 are relatively large to produce the majority of the propulsion thrust during engine operation, they also may contribute significantly to engine vibratory response and any unbalance therefrom.

The drive shafts 26,30 and two rotors 34,36 are suitably mounted in the engine in corresponding bearings supported from various stator frames 48-54.

For example, a forward first frame 48 is located at the inlet end of the engine and supports the forward end of the second drive shaft 30.

A compressor second frame 50 is mounted between the low and high pressure compressors 14,18 and supports the forward end of the first drive shaft 26.

A turbine midframe 52 provides a third frame between the HPT 24 and IPT 28 for supporting the aft ends of the two drive shafts 26,30.

And a turbine rear frame 54 provides a fourth frame between the IPT 28 and the LPT 32 for supporting both LPT rotors 34,36.

Since the two LPT rotors 34,36 including their corresponding rotor blades and fan blades can contribute significantly to vibratory unbalance of the engine, it is desired to monitor vibration or unbalance thereof.

Accordingly, one or more vibration sensors 56,58 may be suitably mounted or affixed in the engine at accessible locations for measuring total vibration as a function of time T(t) of the engine including vibration due to rotation of the two LPT rotors 34,36 in particular. The two sensors 56,58 may have any conventional configuration, such as precision accelerometers, and may be conveniently mounted in the forward frame 48 and the rear frame 54 for measuring total vibration transmitted thereto.

A vibration monitor 60 is operatively joined to the two sensors 56,58 for receiving the vibration signals therefrom during engine operation. The monitor 60 is preferably in the form of a dedicated digital computer specifically configured in hardware and software for high speed electrical processing of the vibration signal. The monitor 60 may be located on the engine itself, or in the supporting pylon, or in the aircraft as desired. The monitor 60 may process either or both signals from the two sensors 56,58 depending on signal strength and content of vibratory response.

Figure 2:
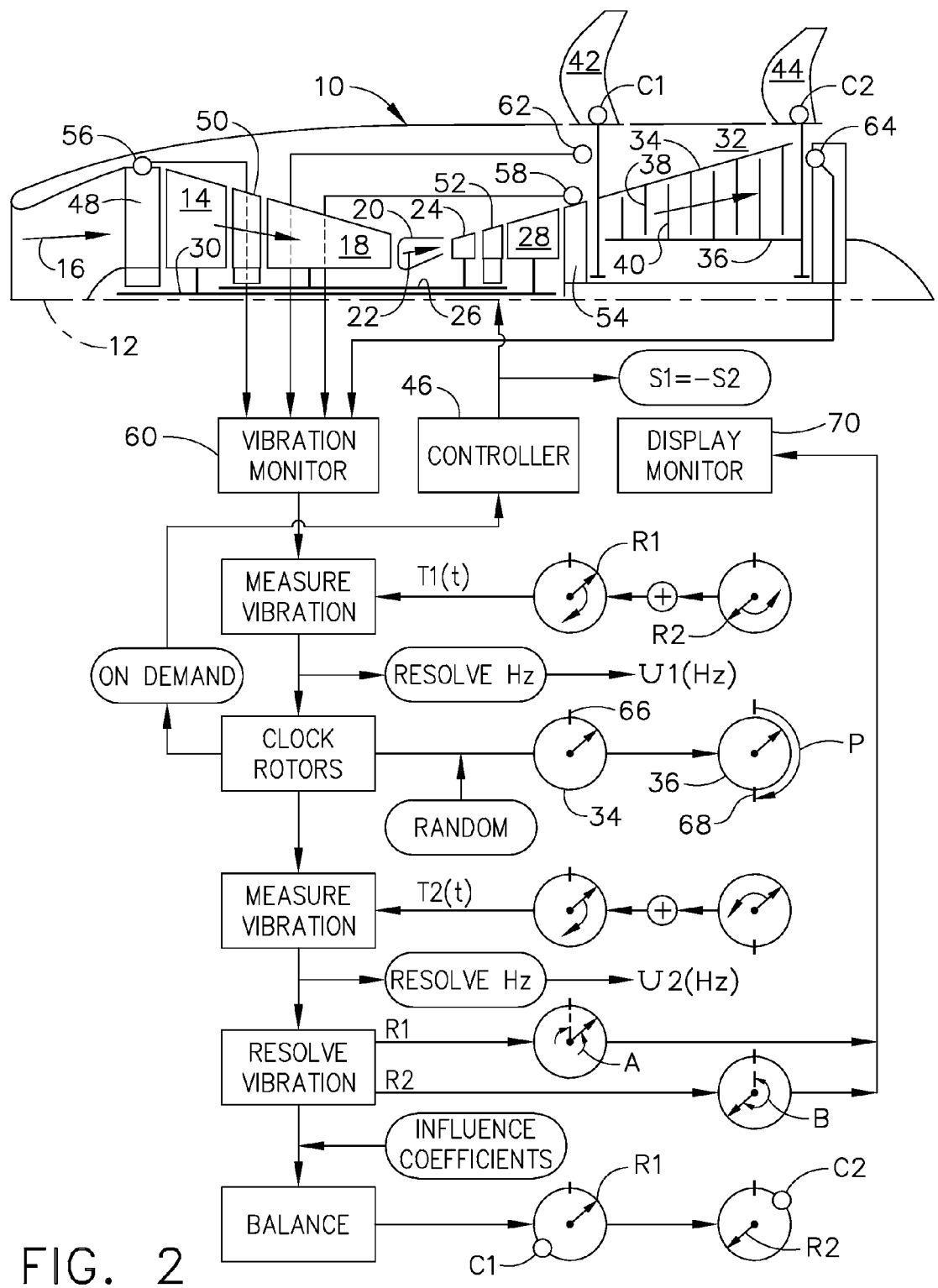
FIG. 2 is a schematic representation of the turbofan engine illustrated in FIG. 1, including a flowchart of an exemplary method of vibration monitoring and balancing of the engine.

FIG. 2 illustrates schematically a preferred method of monitoring vibration, and in particular unbalance, of the gas turbine engine 10 during rotary operation thereof, including for example at steady state rotary speed during cruise operation of the aircraft in flight.

The vibration monitor 60 may use either one of the two sensors 56,58 for firstly measuring a first total vibration T1 of the engine 10 over a first time interval (t) during rotation of the LPT rotors 34,36. This total vibration as represented by the corresponding measured vibration signal will include, or be effected by, a first rotor unbalance R1 due to the first LPT rotor 34 in addition to a second rotor unbalance R2 due to the LPT second rotor 36.

Since the two rotors 34,36 operate at equal, but opposite, rotary speeds S1,2, for example 1200 RPM, the measured vibrations for the two rotors will occur at the same frequency, 20 Hz for example.

The first total vibration T1 will include not only components from the two rotors 34,36, but also additional components from the first and second drive shafts 26,30 and all other components which contribute to the collective vibration being measured.

FIG. 2 also illustrates schematically that any unbalance in the first rotor 34 may be represented by a corresponding vector R1 for the first rotor unbalance which rotates with the first rotor in one direction during operation. Correspondingly, any unbalance in the second rotor 36 is represented by another vector R2 for the second rotor unbalance which rotates oppositely or counter to the first rotor unbalance R1.

By clocking the relative phase P of the two rotors 34,36, as represented by corresponding phase angles, the constituent rotor unbalance components R1,2 may be resolved from each other notwithstanding the same frequency response thereof.

Since the two rotors 34,36 rotate independently from each other, they may be clocked relative to each other to effect the relative phase P in any convenient manner, with this change in phase correspondingly changing the relative rotary positions of the two unbalance vectors R1,2 and correspondingly changing their contributions to the total vibration signal T(t) as measured by the sensors 56,58.

Accordingly, a second total vibration (T2) of the engine 10 may be measured by the sensors 56,58 following the phase clocking yet again during continued rotation of the two rotors 34,36 with the clocked phase therebetween.

The second total vibration T2 is measured over a corresponding second time interval (t), with the measured time intervals for the first and second total vibrations being on the order of a few seconds each.

Since the constituent first and second rotor unbalances R1, R2 are unknown variables, they may be readily solved or derived from the measured or known total vibrations T1,2 and the known relative phase P.

This may be automated in the vibration monitor 60 using suitable signal processing algorithms or software contained therein.

In particular, first and second total vibrations or unbalances U1,2 at a common response frequency are resolved from the measured first and second total vibrations T1,2. In other words, the first and second total vibration T1,2 may be resolved from the time domain to the frequency domain in Hertz (Hz).

As indicated above, the first and second rotor unbalances R1,2 will have the same fundamental or synchronous frequency, such as the 20 Hz example. However, the first synchronous total unbalance U1 will have one combination of the constituent rotor unbalances R1,2, whereas the second synchronous total unbalance U2 will have a different combination of the constituent rotor unbalances R1,2, but at the known relative phase angle P therebetween.

Sufficient information therefore exists in the known relative phase P and measured total unbalances U1,2 to resolve the first and second component rotor unbalances R1,2 for the first and second rotors 34,36, respectively.

Accordingly, the vibration monitor 60 may be conventionally configured first to measure the total engine vibration T(t) continuously over time and correspondingly resolve the total unbalance signal U(Hz) at the associated synchronous frequency of the counterrotating rotors 34,36. In this way, the total vibration or unbalance of the two collective rotors 34,36 may be continuously monitored for vibration trends, including any total vibration thereof which might exceed a predetermined minimum or threshold value.

Secondly, by also introducing the special procedure for measuring and additionally resolving the constituent rotor unbalances R1,2 of the engine 10 when the threshold is exceeded for example, the vibration monitor 60 has the additional technical effect of real time monitoring of the individual rotors 34,36 during running operation over the entire operating cycle. Furthermore, the monitored vibration may also be used for initially balancing and rebalancing the two rotors 34,36 as described later hereinbelow.

As indicated above, the engine controller 46 is specifically configured for running the engine 10 at matching rotary speeds of the two LPT rotors 34,36. The controller 46 also controls operation and speeds of the two drive shafts 26,30 as well.

The first drive shaft 26 is found in the core engine including the compressor 18, combustor 20, and HPT 24, and its rotary speed is also controlled by the controller 46 and is substantially faster, and therefore different, than the common rotary speed of the two LPT rotors 34,36.

Accordingly, the engine 10 is run at matching rotary speeds of the two rotors 34,36 during the first and second vibration measurements, which measurements will additionally include vibratory components from the faster rotation of the first drive shaft 26 as well as from the additional rotation of the second drive shaft 30, with collective vibration signals of all rotary components over a corresponding frequency or range of vibratory response.

The total measured vibrations T1,2 will therefore include vibratory response from all rotating shafts and rotors. The total vibration may then be resolved into its synchronous components, with the common synchronous component for the dual rotors 34,36 being selected for the corresponding first and second total vibrations U1,2.

The non-selected synchronous components of the measured total vibration may be otherwise used in any conventional manner as desired. However, the first and second rotor unbalances R1,2 may be readily resolved as described above at the matching rotary speeds for the two rotors 34,36.

Fundamental to the successive vibration measurements T1,2 described above is the known clocking between the two rotors 34,36. The monitor 60 is specifically configured for resolving the first and second total unbalances U1,2 from the measured total vibrations T1,2 due to the clocked relative phase of the two rotors 34,36 between the successive measurement times or intervals.

Accordingly, the engine 10 illustrated in FIG. 2 preferably also includes corresponding reference sensors 62,64 suitably mounted therein and operatively joined to the monitor 60 for measuring rotary phase indexes or references 66,68 in respective ones of the two rotors 34,36. The two references 66,68 may be in the form of simple notches at corresponding locations around the circumference of the two rotors 34,36, with the two sensors 62,64 being suitably mounted in the engine closely adjacent to the rotary planes of the corresponding references 66,68.

In this way, a 1/rev signal is generated by the sensors 62,64 each time the corresponding reference notch 66,68 passes the sensor to provide an indication of rotary position of the individual rotors and corresponding reference points for the respective phase angles A,B of the detected rotor unbalances R1,2.

With the use of the two reference sensors 66,68, the relative phase P of the two rotors 34,36 may be predeterminedly clocked on demand in the monitor 60 between the successive measurements of the first and second total vibrations T1,2. On demand clocking may be effected automatically or periodically inside the monitor 60, or may also be effected by manual on demand request from an operator such as a maintenance technician or aircraft pilot.

As indicated above, the engine controller 46 is specifically configured for controlling and matching rotary speeds of the two LPT rotors 34,36 during operation. The vibration monitor 60 may also be configured to cooperate with the engine controller 46 for effecting clocking of the desired relative phase P of the two rotors 34,36 on demand between the successive vibration measurements T1,2.

For example, the controller may briefly (few seconds) cause a small increase in speed (few RPM) of the second rotor 36 to effect the desired clocked phase P which is in the preferred range of 90 degrees to 270 degrees, with 180 degrees being a preferred value for maximizing the differences in the total synchronous unbalances U1,2.

Similarly, the originally measured total vibrations T1,2 will also include components from the rotor unbalances R1,2 with enhanced differences therebetween.

The introduction of the clocked phase is sufficiently brief to prevent any undesirable beating from the counterrotating fan blades 42,44 and will therefore be indiscernible to the passengers onboard the aircraft. Since the total vibrations T(t) and U(Hz) are preferably monitored continuously, the on demand clocking may be limited to once per flight, or when the total vibration exceeds the predetermined threshold, and undesirable beating will be further avoided.

Following the rotor clocking, the measured first and second total vibrations T1,2 may be suitably filtered, using a Fast Fourier Transform (FFT) for example, to obtain the synchronous vibrations therefrom in vectors corresponding to the first and second total unbalances U1,2.

Since the original rotor unbalances R1,2 are individual vectors with magnitude and phase they effect corresponding vibratory response vectors with magnitude and phase which form the constituent components of the first and second total unbalances U1,2. In other words, the underlying rotor unbalances and effected vibratory response may be conveniently represented by corresponding complex vectors with corresponding phase angles, and relative phase angle therebetween during operation.

Accordingly, vector resolution of the total unbalances U1,2 may be conveniently integrated into the vibration monitor 60 through corresponding signal processing or software.

More specifically, the first and second rotor unbalances R1,2 are initially unknown vectors and can be expressed in the signal processing as vibratory amplitude or peak vibration in mils and corresponding phase angle. Since the two rotor unbalances R1,2 rotate oppositely to each other during operation, they will add or combine together differently due to their relative phase.

In particular, they will combine differently due to the known, or on demand clocked relative phase specifically introduced to form the two known first and second total unbalances U1,2 obtained by measurement. Accordingly, sufficient known variables are available with the unknown rotor unbalances R1,2 to algebraically resolve or calculate those unknown unbalances R1,2 in the monitor 60.

For example, the measured first total unbalance U1 is equal to the sum of its constituent parts including rotor unbalances R1 and R2 all in vector form in one equation.

Correspondingly, the measured second total unbalance U2 is also equal to the sum of its same constituent parts including the first and second rotor unbalances R1 and R2, in a second equation, but at different phase positions from the first total.

However, since the rotor unbalances R1,2 are counterrotating vectors they will combine differently in the two equations for the corresponding total unbalances U1,2, except, however, the relative phase P therebetween is an additional known variable.

Accordingly, the resulting two equations and two unknowns may be readily resolved algebraically to determine the corresponding values of the two rotor unbalances R1,2.

In a simple example, the first unbalance R1 may have a magnitude of 5 mils and the second unbalance R2 may have a magnitude of 3 mils, with both unbalances counterrotating on the respective rotors 34,36.

In the specific condition where the two unbalances are in phase, the first total unbalance U1 is the sum of R1 and R2 and equals 8 in magnitude. Correspondingly, the combination of the two unbalances 180 degrees out of phase for the second total unbalance U2 is the difference between R1 and R2 and has a magnitude of 2.

The known solution for this example calculates R1 as being (U1+U2)/2, or 5; and R2 as being (U1−U2)/2, or 3.

Correspondingly, the complex vector variables R1 and R2 may be readily solved at any known relative phase therebetween from their different combinations in the two equations resulting in the corresponding total unbalances U1 and U2 having measured and known values.

Accordingly, the introduction of the specifically configured vibration monitor 60 illustrated in FIG. 2 permits in situ monitoring of vibration in the UDF engine 10 in its true running condition including its dual, counterrotating LPT rotors 34,36, as well as the additional drive shafts 26,30 therein.

The dual measurements of total vibration T1,2 and intervening rotor clocking permit frequency resolution of the various resonant vibration components including those associated with the two rotors 34,36.

And, the total vibratory unbalances U1, U2 corresponding with the two rotors 34,36 may be further resolved into the constituent rotor unbalances R1 and R2 which may be conveniently monitored in a corresponding display monitor 70 conveniently located in the aircraft cockpit. Real time monitoring of the vibratory response of the two LPT rotors 34,36 may be readily effected and allows the convenient observation of vibratory trends in the engine which is particularly important if vibration increases over time.

However, since the vibration monitor 60 is preferably introduced in the original turbofan engine 10 upon its manufacture, it may also be used in original and subsequent balancing of the engine itself.

Accordingly, following the calculation of the individual unbalances R1 and R2, the vibration monitor 60 may be further configured and further used for balancing the first and second rotors 34,36 by adding thereto corresponding first and second corrective balance weights C1 and C2, respectively, in opposition to counteract the corresponding first and second rotor unbalances R1, R2.

As indicated above, any single rotor unbalance vector R1 or R2 may be used to determine a corresponding corrective balance weight using know procedures, typically including influence coefficients.

For each of the two rotor unbalances R1 and R2 determined above, the corresponding balance weights C1, C2 may be derived from suitable influence coefficients relating corrective mass at the first and second rotors 34,36 to the vibratory amplitude of the first and second rotor unbalances R1, R2.

The influence coefficients are readily determined by temporarily installing known balance weights at the intended balance planes of the weights C1,2, typically at accessible locations of the corresponding rotors at the hubs of the fan blades. The engine is then operated at speed using the temporary test weights to determine the corresponding amplitudes of vibration at the corresponding sensors 56,58 for example.

In this way, the test weights are used to determine the direct correspondence between the balance weights C1,2 and the resulting vibratory response and amplitude at the sensors 56,58, and therefore influence coefficients.

And correspondingly, when the known rotor unbalances R1,2 are determined by the vibration monitor 60, the so-determined influence coefficients may be used for determining or calculating the requisite correction weights C1,2 that may be positioned in the corresponding balance planes of the two rotors 180 degrees out of phase with the measured rotor unbalance vectors R1,2.

Accordingly, when the first and second balance weights C1,2 are suitably affixed to the first and second rotors 34,36, respectively, in 180 degree out of phase opposition to the corresponding first and second rotor unbalances R1,2, the two LPT rotors 34,36 will be substantially balanced.

After balancing, the vibration monitor 60 may then be used over the operating life of the engine and aircraft to continue monitoring the vibratory response of the engine 10 including the two LPT rotors 34,36 to determine any changes in the initial, factory-made balance correction of the engine and rotors.

Since the vibration monitoring procedure described above depends on clocked rotation of the matched speed LPT rotors 34,36, clocking of the two rotors is preferably introduced on demand in an automated, periodic manner.

However, the relative phase P of the two rotors 34,36 may be otherwise clocked randomly between measuring the first and second total vibrations T1,2, if desired.

For example, the two reference sensors 62,64 may be used for continuously monitoring the corresponding phase references 66,68 of the two rotors 34,36 during normal rotary operation of the engine 10.

The first total vibration T1 of the engine may be periodically measured during rotation of the rotors 34,36 and then repeatedly stored in a suitable memory device inside the vibration monitor 60.

Since the engine controller 46 precisely controls operating speed of the two rotors 34,36, the relative phase angle therebetween will remain substantially constant during typical engine operation, or may be modified to undergo slight but random changes.

Or, the relative phase angle P between the two rotors will most likely change between successive shutdown operations of the engine, for example between aircraft flights on the same or different days.

By monitoring the phase references 66,68 over time, it may be determined when the relative phase clocking between the two rotors falls within a predetermined range of about 90 degrees to about 270 degrees, with 180 degrees being preferred.

Upon detecting that phase clocking occurrence, the second total vibration T2 may then be measured in the operating engine and then used in conjunction with the previously stored first total vibration T1 to conduct resolution of the two signals in the frequency domain followed by resolution of the constituent rotor unbalances R1 and R2 as described above.

Since the vibration monitor 60 is in the preferred form of a digital computer, it will also include suitable memory devices therein to digitally store the measured first and second total vibrations T1, T2 and all cooperating parameters for resolving the individual rotor unbalances R1 and R2 as described above, and including applying influence coefficients for in turn determining any required correction balance weights C1 and C2.

Accordingly, notwithstanding the matching speed operation of the counterrotating LPT rotors 34,36 and their resulting common frequency vibratory response, the independent rotor unbalances R1 and R2 corresponding to the two rotors may be readily resolved in a simple two equation algorithm specifically introduced into the vibration monitor 60. Vibration monitoring and rotor balancing may otherwise be conducted in conventionally known manners.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A method of monitoring vibration in a gas turbine engine having a core engine and first and second low pressure turbine rotors comprising:
    running said engine at matching rotary speeds of said rotors and different rotary speed of said core engine;
    measuring a first total vibration of said engine during rotation of said rotors;
    clocking relative phase of said rotors;
    measuring a second total vibration of said engine during rotation of said rotors with said clocked phase therebetween;
    resolving first and second total unbalances at a common response frequency from said measured first and second total vibrations; and
    resolving first and second rotor unbalances for said first and second rotors, respectively, from said first and second total unbalances.

2. A method according to claim 1 further comprising:
    measuring rotary phase references in said first and second rotors; and
    filtering said measured first and second total vibrations to obtain synchronous vibrations therefrom in vectors including vibratory amplitude and referenced phase corresponding to said first and second total unbalances.

3. A method according to claim 2 wherein:
said first and second rotor unbalances are initially unknown vectors and combine together differently due to said clocked relative phase to form said first and second total unbalances; and
said first and second total unbalances and clocked relative phase are known variables used to algebraically resolve said first and second rotor unbalances.

4. A method according to claim 3 wherein said relative phase of said rotors is clocked on demand between measuring said first and second total vibrations.

5. A method according to claim 4 wherein:
said engine further includes a controller configured for controlling rotary speeds of said rotors and core engine; and
said controller is further configured for clocking relative phase of said rotors on demand between measuring said first and second total vibrations.

6. A method according to claim 3 wherein said relative phase of said rotors is clocked randomly between measuring said first and second total vibrations.

7. A method according to claim 6 further comprising:
monitoring said phase references of said first and second rotors during rotary operation of said engine;
storing said measured first total vibration; and
measuring said second total vibration after said monitored phase references of said rotors indicate relative phase clocking therebetween within a predetermined range.

8. A method according to claim 3 further comprising balancing said first and second rotors by adding thereto first and second corrective balance weights, respectively, in opposition to said corresponding first and second rotor unbalances.

9. A method according to claim 8 wherein said balance weights are derived from influence coefficients relating corrective mass at said first and second rotors to vibratory amplitude of said first and second rotor unbalances.

10. A method according to claim 3 wherein said first and second measured total vibrations are filtered using a Fast Fourier Transform.

11. A method of monitoring vibration in an engine having first and second rotors comprising:
measuring a first total vibration of said engine during rotation of said rotors;
clocking relative phase of said rotors;
measuring a second total vibration of said engine during rotation of said rotors with said clocked phase therebetween;
resolving first and second total unbalances at a common response frequency from said measured first and second total vibrations; and
resolving first and second rotor unbalances for said first and second rotors, respectively, from said first and second total unbalances.

12. A method according to claim 11 further comprising running said engine at matching rotary speeds of said rotors during said first and second vibration measurements.

13. A method according to claim 12 further comprising filtering said measured first and second total vibrations to obtain synchronous vibrations therefrom in vectors corresponding to said first and second total unbalances.

14. A method according to claim 13 wherein:
said first and second rotor unbalances are initially unknown vectors and combine together differently due to said clocked relative phase to form said first and second total unbalances; and
said first and second total unbalances and clocked relative phase are known variables used to algebraically resolve said first and second rotor unbalances.

15. A method according to claim 14 further comprising balancing said first and second rotors by adding thereto first and second corrective balance weights, respectively, in opposition to said corresponding first and second rotor unbalances.

16. An engine comprising:
first and second rotors;
a vibration sensor mounted in said engine for measuring total vibration due to rotation of said rotors;
a vibration monitor operatively joined to said sensor, and configured for first resolving first and second total unbalances at a common response frequency from corresponding first and second total vibrations measured by said sensor at successive times, and further configured for secondly resolving first and second rotor unbalances for said first and second rotors, respectively, from said first and second total unbalances;
a controller configured for matching rotary speed of said rotors during operation of said engine; and
wherein said monitor is further configured for resolving said first and second rotor unbalances at matching rotary speeds of said rotors.

17. An engine according to claim 16 wherein said monitor is further configured for resolving said first and second total unbalances from said measured vibrations due to clocked relative phase of said rotors between said successive times.

18. An engine according to claim 17 wherein said monitor is further configured for filtering said measured first and second total vibrations to obtain synchronous vibrations therefrom in vectors corresponding to said first and second total unbalances.

19. An engine according to claim 18 wherein:
said first and second rotor unbalances are initially unknown vectors and combine together differently due to said clocked relative phase to form said first and second total unbalances; and
said first and second total unbalances and clocked relative phase are known variables used in said monitor to algebraically resolve said first and second rotor unbalances.

20. An engine according to claim 19 further comprising first and second balance weights affixed to said first and second rotors, respectively, in opposition to said corresponding first and second rotor unbalances.

* * * * *